United States Patent [19]

Molnar et al.

[11] Patent Number: 4,785,265
[45] Date of Patent: Nov. 15, 1988

[54] ENHANCED AUTOMATIC LINE BUILD OUT

[75] Inventors: Ramon Molnar, Willoughby Hills; Denis M. Poirier, Cleveland Heights, both of Ohio

[73] Assignee: The Babcock & Wilcox Company, New Orleans, La.

[21] Appl. No.: 103,858

[22] Filed: Oct. 1, 1987

[51] Int. Cl.⁴ .............................................. H03H 11/06
[52] U.S. Cl. ..................................... 333/18; 330/284; 375/12; 379/398
[58] Field of Search ............... 333/17 R, 18; 330/145, 330/284, 304; 375/12; 370/97; 379/340, 398, 400

[56] References Cited

U.S. PATENT DOCUMENTS

| | | | |
|---|---|---|---|
| 2,557,888 | 6/1951 | Olson | 330/145 X |
| 2,902,548 | 9/1959 | Moeller | 330/145 X |
| 3,568,100 | 3/1971 | Tarbox | 333/18 |
| 3,578,914 | 5/1971 | Simonelli | 333/18 X |
| 3,671,886 | 6/1972 | Fudemoto et al. | 333/18 |
| 3,904,992 | 9/1975 | Iwakami | 333/18 |
| 4,393,513 | 7/1983 | Yokogawa et al. | 330/284 X |

Primary Examiner—Paul Gensler
Attorney, Agent, or Firm—Vytas R. Matas; Robert J. Edwards

[57] ABSTRACT

A line build out comprises a control voltage mechanism for applying a control voltage to a tuning diode or varactor. The control voltage is generated so as to be indicative of the length of a cable over which the signal has traveled. The capacitance of the tuning diode or varactor is changed according to the control voltage. A resistor is connected to the cathode of the tuning diode or varactor and a capacitor is connected to the anode of the tuning diode or varactor. A signal can be measured at the cathode which corresponds to the incoming signal and has been attenuated by frequency roll-off in accordance with the length of the cable over which the signal has traveled. In this way, attenuation for signals over cables of various length can be equalized in a manner which not only takes into account the length of the cable, but also the frequency of the signal.

10 Claims, 4 Drawing Sheets

EALBO FREQUENCY RESPONSE

ALBO FREQUENCY RESPONSE

INCOMING COMMUNICATIONS
SIGNALS                +        EALBO           =   EALBO OUTPUT

EQ INPUT/EALBO OUTPUT          EQ AMP                  = EQ OUTPUT
              +

ENHANCED AUTOMATIC LINE BUILD OUT

FIELD AND BACKGROUND OF THE INVENTION

The present invention relates in general to signal adapting circuitry, and, in particular, to a new and useful automatic line build out circuit for use in processing digital data coming to a receiver over different cables having various lengths.

In a digital communications system, digital data is sent and received along several cables of varying lengths. The digital data becomes much weaker and more distorted when traveling through a long cable path as opposed to a short one. For example, the data is weaker and more distorted when traveling along a 2 kilometer cable length than a 1 meter cable length.

The data sent through long cable lengths must be amplified and equalized to try and reconstruct the "clean" data pulses originally transmitted. The data signal pulses that go through the shortest cables require almost no amplification or equalization. Amplification involves increasing the height of the signal's waveform peak. Equalization involves undistorting the shape of the signal's waveform so it looks like the signal that was first transmitted through the cable. This is done by increasing the amplitude of the signal wave in proportion to attenuation, or drop in wave amplitude, caused by the length of the communications cable.

Because signals traveling through several different lengths of cables are often transmitted to a single receiver, the degree of attenuation of the signals at the receiver is also varied. Rather than have a separate receiver for each length of cable to receive each differently attenuated signal, the state of the art is to provide some type of circuitry before the receiver to make each signal conform to standard characteristics.

The receiver must be able to accommodate the most attenuated signals from the longest length of cable. Therefore, the standard characteristics that signal waves must conform to before being input to the receiver are those resulting from their travelling through the longest cable length in the communication system.

Each data pulse train making up a communication signal is actually composed of two or more pulse trains of varying frequency. The lowest frequency pulse train is called the fundamental. The higher frequency pulse trains are whole number multiples of the fundamental and are called harmonics. FIG. 1 shows a fundamental and a harmonic that combine to form a data pulse train.

When a communication signal travels through a long cable, the higher frequency harmonics are attenuated more than the lower ones, distorting the overall signal. These upper harmonics must be amplified more than the lower ones on the receiving end of the cable in order to reconstruct the signal that was originally transmitted. For this reason, the second block of a receiver, called an equalization amplifier, performs this function in known communication systems.

Equalization amplifiers are not necessarily variable, meaning that they can not adjust themselves to a varying degree of attenuation for every signal which travels through a different length of cable. For simplicity equalization amplifiers are set up to handle the worse case of attenuation or the signals from the longest length of cable. The signals from the smaller lengths must then be distorted to the degree of the longest cable in order to be input to the single equalization amplifier.

If this did not happen, the equalization amplifier would over amplify the signals from the shorter cable lengths, thereby distorting these clearer signals. What actually happens then is that the clearer signals from the shorter cables must actually be attenuated or degraded before they are input to the equalization amplifier or receiver.

Therefore, known communications systems provide a circuit which is designed to attenuate the signals from different cable lengths to conform to the degree of attenuation seen in a signal from the longest cable length. These known circuits are called Automatic Line Build Out circuits or ALBOs.

Prior art ALBOs use voltage gain techniques to provide the attenuation needed by the stronger signals from the shorter cable lengths. These ALBOs use devices such as field effect transistors (FET) to attenuate the amplitude of the incoming signal wave (See FIG. 2). In FIG. 2, Vc, a signal corresponding in proportion to the cable length and generated by a controlling device, is input to the FET, as shown. This Vc adjusts the resistance of the FET to decrease the amplitude of the signal wave a certain degree, corresponding to the cable length. The signal is then applied to the equalization amplifiers (EQ amp.). This will make all cable lengths attentuate to he degree of signals from the longest cable length (see FIG. 3).

The problem with the prior art ALBOs is that they only adjust signals in terms of amplitude or output voltage and not distortions in the signals shape or frequency response. In other words, previous ALBOs do not provide for varying degrees of attenuation in the fundamental and the different harmonics that make up a signal wave. Also, the previous ALBOs do not compensate for the loss of bandwidth in longer cables. These deficiencies prevent the use of the correct amount of distortion at very long cable lengths before outputting the signal to an equalization amplifier.

SUMMARY OF THE INVENTION

In accordance with the present invention, these problems are corrected by making signals from all cable lengths look like the longest cable in both attenuation and frequency response. In other words, the inventive or enhanced ALBO (EALBO) attenuates the fundamental and harmonic components of a signal wave in the varying degrees that a signal traveling the longest cable would be attenuated.

Accordingly, an object of the present invention is to provide a line build out circuit for equalizing signals from plural cables of different lengths, comprising control voltage means for generating a control voltage indicative of the length of a cable to be traveled by a signal to be equalized, a tuning component having an anode connected to the control voltage means for receiving the control voltage, and a cathode, the tuning component being tuned according to the control voltage, a capacitor connected to the anode and a resistor connected to the cathode, the signal being measured at the cathode. The tuning component may be a tuning diode or a varactor, and has a capacitance which varies according to the control voltage. The tuning component and resistor together act as an RC tuning circuit. The signal measured at the cathode of the tuning component has a frequency roll-off which represents the degree of attenuation that depends on the frequency of the signal being input over the resistor to the cathode.

A further object of the present invention is to provide an enhanced automatic line build out circuit which is simple in design, rugged in construction and economical to manufacture.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
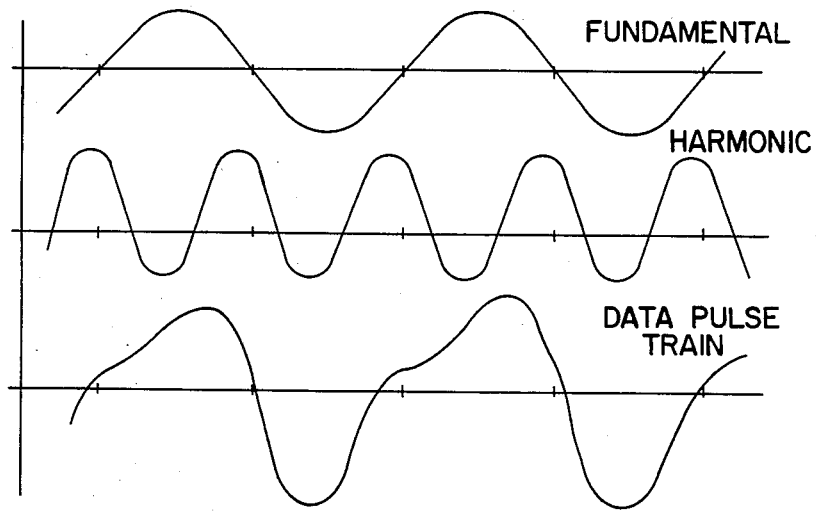
FIG. 1 is a graph representing fundamental, harmonic and data pulse trains representing signals that can be conveyed along a cables of various lengths.
Figure 2:
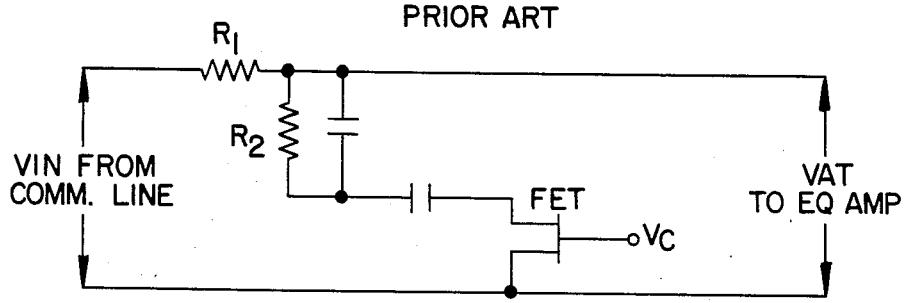
FIG. 2 is the schematic circuit of a prior art automatic line build out.
Figure 3:
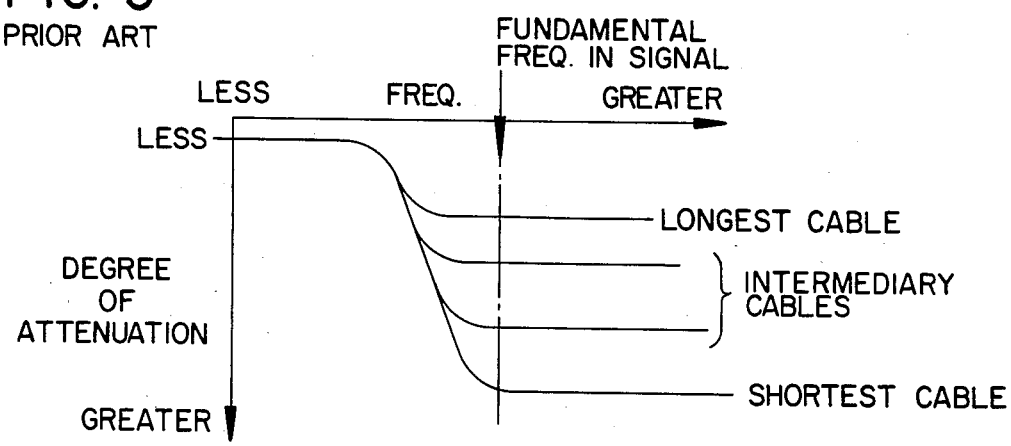
FIG. 3 is a graph plotting degree of attenuation against frequency for the circuit of FIG. 2.
Figure 4:
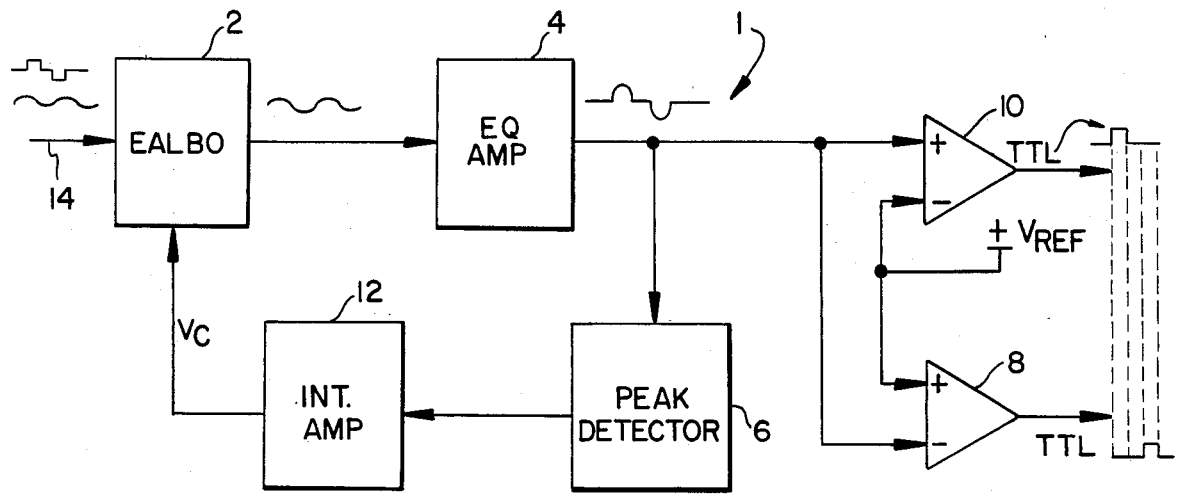
FIG. 4 is a block diagram showing a circuit for equalizing signals from a plurality of cables having different lengths and utilizing the enhanced automatic line build out of the present invention.
Figure 5:
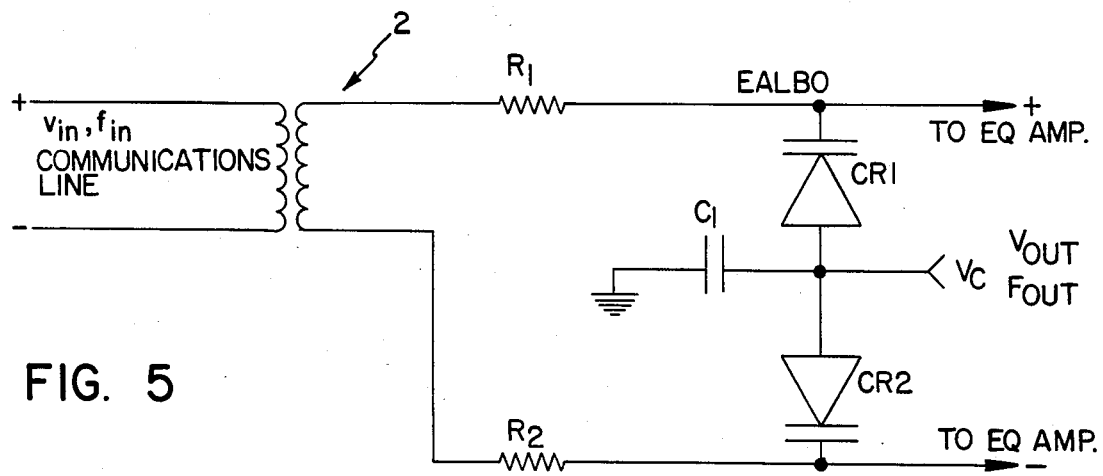
FIG. 5 is a schematic diagram showing one embodiment of the enhanced automatic line build out of the present invention.
Figure 6:
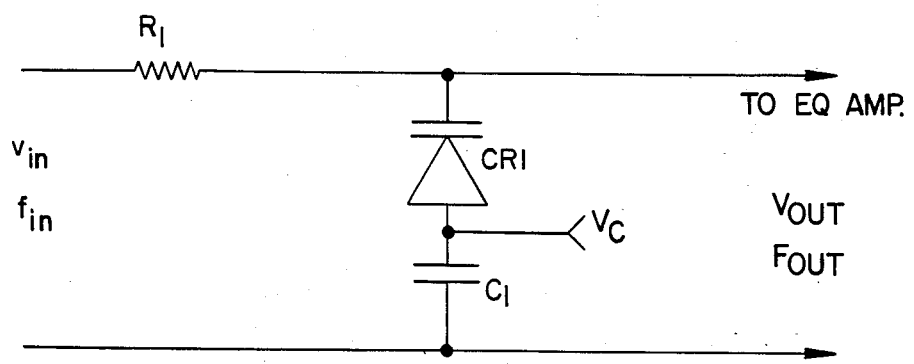
FIG. 6 is a view similar to FIG. 5 showing another embodiment of the invention.

Referring to the drawings in particular, the invention embodied in FIGS. 4 through 6 comprises an enhanced automatic line build out circuit for equalizing signals received over cables having various lengths.

An overall receiver circuit generally designated 1, for communications signals is shown in FIG. 4. It includes an inventive EALBO circuit 2 connected to an equalization amplifier (EQ amp) 4. The output of the EQ amp 4 is connected to a peak detector 6, to the negative input of a first comparator 8, and to the positive input of a second comparator 10. The output of the peak detector 6 is connected to an integration amplifier 12. The output of the integration amplifier 12 is connected back to the EALBO 2. A positive DC voltage, Vref, is connected to the negative input of the second comparator 10 and to the positive input of the first comparator 8. All components 4–12 are known in the art.

In operation, the EALBO 2 receives the data signal along line 14. This signal is made up of a series of positive and negative pulses. The EALBO 2 adds the required fundamental and harmonic attenuation to this signal so that it looks like it was received from the longest cable in the system no matter what the actual length of the cable was. The equalization amplifier 4 receives the attenuated signal from the EALBO 2 and boosts the fundamental and the harmonics as required by a signal received from the longest cable in the system, attempting to restore the communications signal back to its transmitted shape.

A feedback signal must be sent to the EALBO in order to set the degree of attenuation needed by a particular signal. This is accomplished by detecting the initial peak voltage signal at peak detector 6 from the output of the EQ amp 4. The peak detector 6 is a known combination of diodes and a capacitor which charges in relation to the positive and negative peaks of the signal. This peak voltage signal is fed by the peak detector 6 to the integration amplifier 12. The integration amplifier 12 compares the peak voltage values with constant reference values to arrive at a difference value. This difference value is then integrated, which smooths the signal to create a DC control voltage, Vc. Vc is then sent to the EALBO. Vc is indicative of the length of cable traveled by the present signal.

The signal from the EQ amp 4 is also input to the first and second comparators 8 and 10 respectively. The comparators convert the signal from the EQ amp 4 into standard TT1 0 to +5 v square waves. This data is then sent to the controlling microprocessors of the process control system (not shown). An embodiment of the EALBO 2 circuit is shown in FIG. 5. It comprises a transformer T1 with its primary winding connected across a positive line and negative line which comprises a communications cable. One output from the secondary winding of T1 is connected to a fixed resistor R1 and the other output from the secondary winding of T1 is connected to a fixed resistor R2. Fixed resistor R1 is connected to the cathode of tuning diode CR1 and the resistor R2 is connected to the cathode of tuning diode CR2. The anodes of both CR1 and CR2 are connected to the input of the capacitor C1 and to the control voltage Vc. The output of capacitor C1 is connected to ground. The cathodes of CR1 and CR2 are connected to the two output lines connected to EQ amp 4.

In operation, the transformer T1 isolates the rest of the EALBO circuit from Common Mode Noise. Common Mode Noise is a series of gliches in a signal caused by large motors, transformers, or power lines that are close to a signal transmission line. Common mode noise rejection is a specification of a circuit which defines its ability to reject input noise at its output. The units used when describing common mode noise rejection are decibels. The transformer T1 increases the common mode noise rejection of the circuit shown in FIG. 5 providing isolation from the common mode noise seen on the communication line. This is accomplished because the voltage seen across the secondary winding of the transformer is the difference in voltage at any one time between the positive and negative transmission lines. Common mode noise would be seen across both positive and negative transmission lines. Therefore, the voltage difference seen on the secondary winding will remain the same even if noise appears on the transmission lines.

The transformer T1 is not necessary to the operation of the inventive EALBO circuit, although it aides in operation by cancelling out noise. When not using transformer T1, as in FIG. 5, the EALBO circuit may be single ended as shown in FIG. 6. This is the simplest configuration of the invention for only one tuning diode CR1 is used. Tuning diode CR1 may be a varactor. Such tuning diodes and varactors are known in the art.

Commercially available tuning diodes are the MV1403H to MV1405H diodes from Motorola. Published characteristics are available for these and for a variety of tuning varactors. The remaining components making up the circuit embodied in FIG. 6 are the same components in FIG. 5.

The operation of the circuits of FIG. 5 and FIG. 6 are essentially the same, except that in FIG. 5 there is actually twin EALBO circuits operating and the output to EQ amp 4 actually is the voltage difference between the upper EALBO circuit and the lower EALBO circuti. In FIG. 6, there is one EALBO operating and the output to EQ amp 4 is the voltage difference between the EALBO's output and the ground reference. Neither case is more advantageous than the other except that FIG. 5 facilitates the use of a transformer to improve noise reduction.

Figure 7:
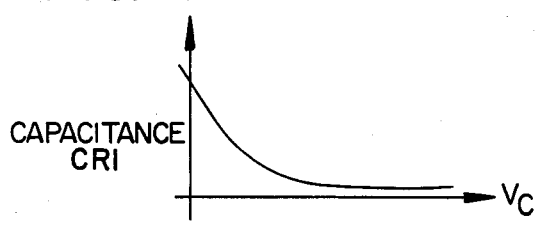
FIG. 7 is a graph plotting capacitance of a tuning device against control voltage for the present invention.

FIG. 6 will be used to describe the actual operation of the EALBO circuit 2. The Vc from the integration amplifier 12 is input to the anode of CR1 and to the capacitor C1. The purpose for providing the capacitor C1 is to supply an AC ground for the anode of CR1. When the voltage Vc is applied to the anode of CR1, the capacitance of CR1 varies according to it. As Vc approaches zero volts DC, the capacitance of CR1 becomes greater (see FIG. 7). The combination of CR1 and R1 acts as an RC timing circuit and as the capacitance of CR1 increases, the frequency roll-off of the timing circuit increases. Frequency roll-off is the degree of attenuation dependent upon the frequency of the signal. Increased frequency roll-off means that attenuation is increased for a given frequency.

For signals which travels through shorter lengths of cable, the Vc input to EALBO 2 is close to zero. This increases the capacitance of CR1, thereby increasing the frequency roll-off of these stronger signals until they reach the frequency roll-off point of a signal seen through the longest wire. For signals traveling through longer wires, the Vc input to EALBO 2 is relatively large. This decreases the capacitance of CR1, thereby decreasing the frequency roll-off of the timing circuit.

This lower frequency roll-off is needed for signals traveling in the longer cables because the major portion of frequency roll-off seen by a signal traveling through the longest cable is already provided by the longer cable.

Figure 8:
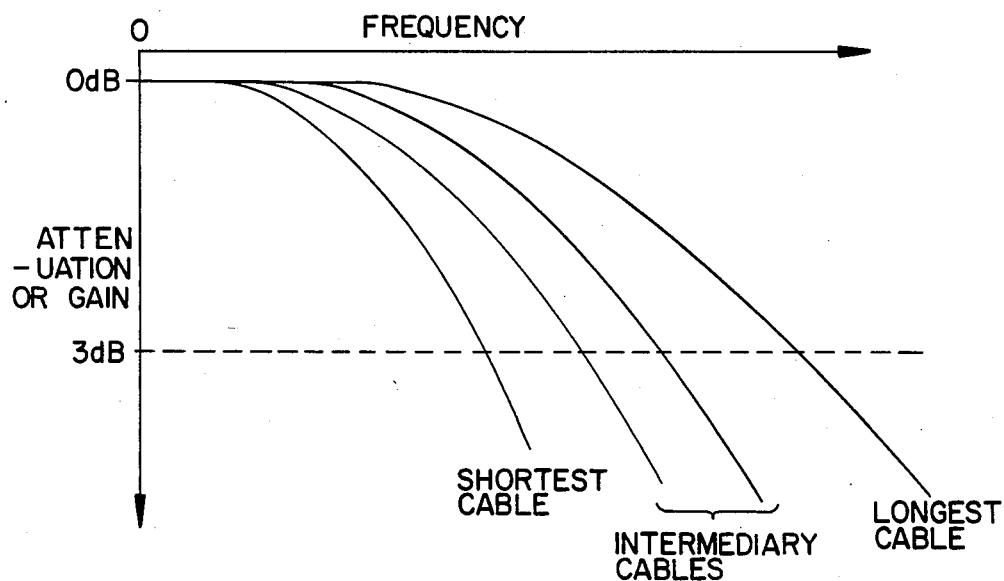
FIG. 8 is a graph plotting attenuation against frequency for signals received along cables having different lengths in accordance with the present invention.

The feedback through peak detector 6 and integration amplifier 12 adjusts the Vc to provide a varying signal dependent upon the length of cable the signal was received from. This, in turn, adjusts the frequency roll-off needed for each signal. By tailoring the degree of frequency roll-off needed to be applied to each received signal, the attenuation to the harmonic and fundamental frequencies that make up the signal can be applied in differing degrees as required. This is needed in order to make each signal completely duplicate the characteristics of a signal traveling through the longest cable in the system. Once this duplication is achieved, the signal can be fully reproduced by the equalization amplifier 4, which is designed to amplify signals from the longest cable in the system. FIG. 8 provides the frequency roll-off curves for a typical EALBO circuit.

From FIG. 8, it is seen that for the shortest cable, the EALBO has the greatest attenuation per frequency, or frequency roll-off, and for the longest cable, the EALBO has the least attenuation per frequency. The main idea is that the longer the cable the greater the bandwidth or 3 db point, whereas the shorter the cable, the smaller the bandwidth or 3 db point. This is also illustrated in FIG. 8. Having separate frequency roll-off curves for each length of cable, allowed the harmonic and fundamental components of a signal to be attenuated at different levels, as required because they travel at varying frequency.

The value of R1 is determined by the minimum allowed control voltage at the anode of the tuning diode to get the maximum value capacitance from the tuning diode or varactor. The dynamic range of the EALBO is only limited by the capacitance range of the tuning diode.

Figure 9:
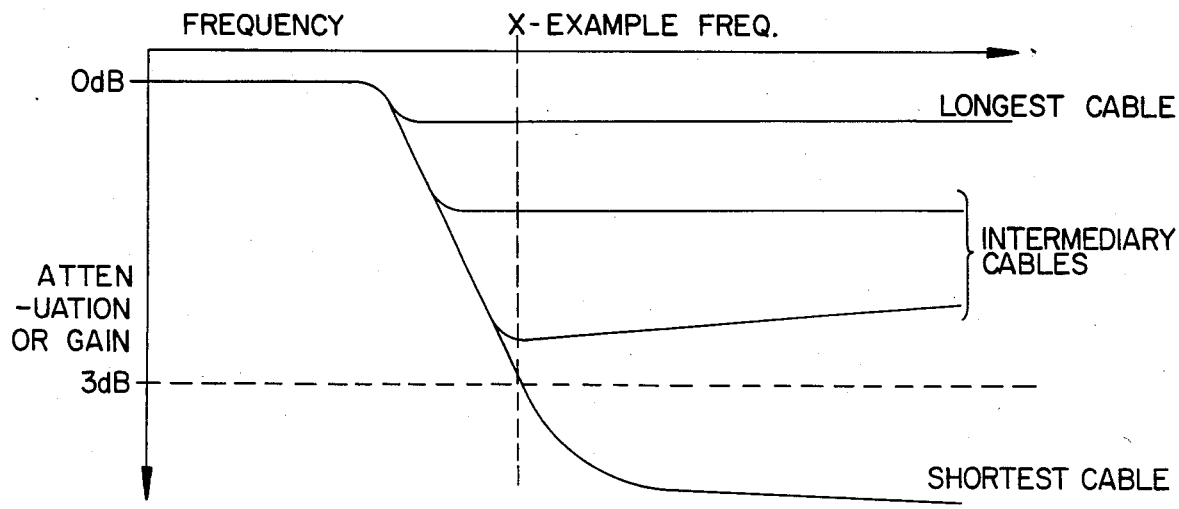
FIG. 9 is a graph plotting attenuation against frequency for signals received over cables of different lengths according to the prior art.

The problem concerning a lack of frequency sensitivity of prior art ALBOs is solved by the invention. By providing a separate frequency response or frequency roll-off for each size of cable that a communication signal may travel through, the harmonic and fundamental components of a signal are adjusted by the invention in varying degrees. The prior art ALBOs cannot do this especially at higher frequencies (see FIG. 9). As can be seen in FIG. 9, the prior art ALBOs have no frequency roll-off beyond a certain frequency for any given length of cable. Thus, the harmonic and fundamental components of a communications signal traveling at different frequencies are attenuated to the same degree. However, in actuality, different degrees of attenuation are needed for the harmonic and fundamental components in order to fully create a signal as seen through the longest cable in the system. The present invention provides these different degrees of attenuation.

Figure 10:
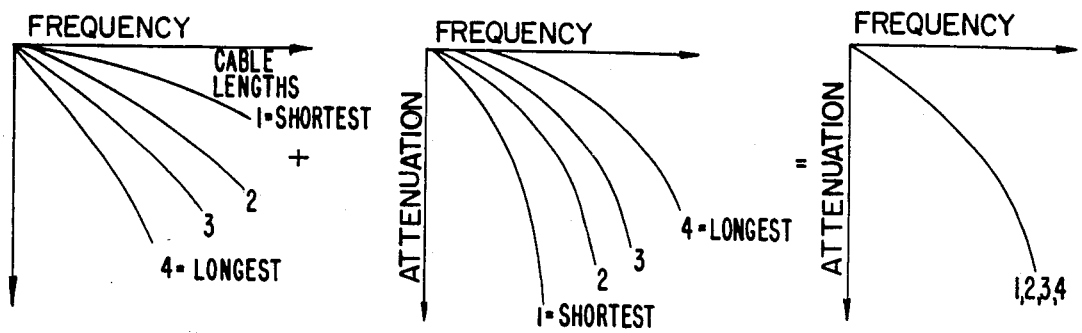
FIG. 10 is a graphic representation of signal processing in accordance with the present invention for equalizing signals received over a plurality of cables having different lengths.
Figure 11:
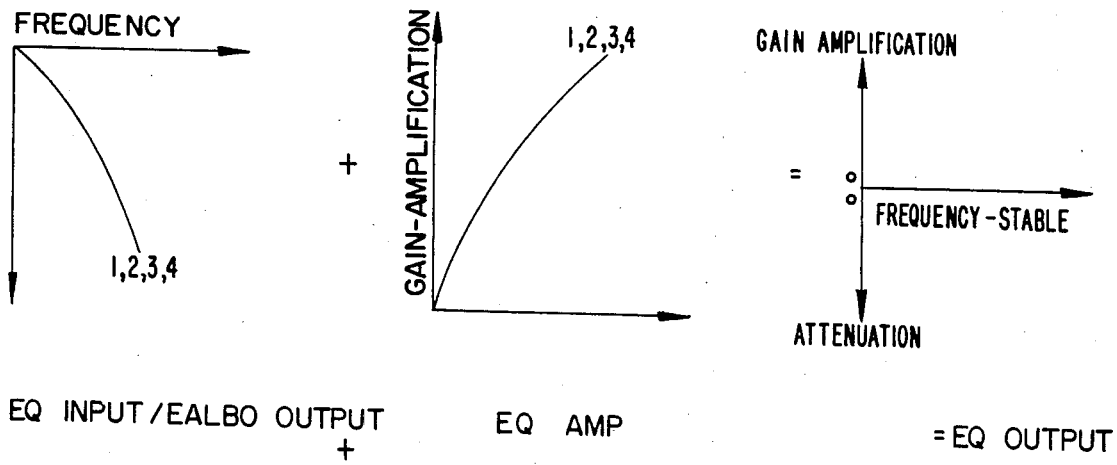
FIG. 11 is a graphic representation similar to FIG. 10 showing the completion of signal processing for producing stable, equalized signals.

By correcting this problem of the prior art, the invention allows longer cables to be used in the communications system and allows the signals to travel at higher frequencies for a given length of cable. The prior art ALBOs did not provide variable frequency roll-offs depending upon the length of cable the signal was traveling through. In the prior art, an equalization amplifier could not be designed to operate with too long of a maximum cable length because the previous ALBOs would not attenuate the smaller cable accurately enough to arrive at a correct reproduction of the signal. In other words, the difference in bandwidths between the longest and shortest cable lengths could not be too great because of the limitations of equalization amplifiers if a prior art ALBO is used. If the invention is used, the limitations of the equalization amplifier is not a factor because the invention can adjust the bandwidth of the varying lengths to conform to the equalization amplifier's optimum attenuation specifications. The invention provides this accurate attenuation by providing the variable frequency roll-off. The resultant waveforms produced by the equalization amplifier in conjunction with the EALBO is shown in FIGS. 10 and 11.

The dynamic range of the EALBO could be increased by cascading multiple stages together, or by using a wider capacitance tuning diode or varactor. Another method of implementing the EALBO would be to use a variable resistor with a fixed capacitor. To handle a system that uses several frequencies, both a variable resistor and tuning diode or varactor could be used. To handle several frequencies though, the equalization amplifier could no longer be fixed and would require some frequency dynamic response using either a variable resistor or tuning varactor.

The invention claimed is:

1. A line build out circuit for equalizing signals from plural cables of different lengths, comprising:

control voltage means for generating a control voltage indicative of the length of a cable to be traveled by a signal to be equalized;

a tuning component having a variable characteristic, an anode and a cathode, said control voltage means being connected to said anode for applying the controlled voltage thereto for varying the variable characteristic;

a capacitor connected to said anode;

a resistor connected to said cathode;

the signal to be equalized being applied over said resistor to said cathode and being measured at said cathode, the signal having a frequency roll-off representing a degree of attenuation which depends upon the frequency of the signal and upon the length of the cable over which the signal was supplied; and a second tuning component having a second anode connected to said first-mentioned anode, and a second cathode, a second resistor connected to said second cathode, said capacitor being connected on one side to said first-mentioned and second anodes, and an opposite side to a reference ground, said control voltage means connected to said first-mentioned and second anodes, the signal being measured between first-mentioned and second cathodes.

2. A circuit according to claim 1, wherein said tuning component comprises a tuning diode, said variable characteristic comprising capacitance of said tuning diode.

3. A circuit according to claim 1, wherein said tuning component comprises a tuning varactor, said variable characteristic comprising capacitance of said tuning varactor.

4. A circuit according to claim 1, including a reference line connected to said capacitor on an opposite side thereof from said tuning component anode, the signal being measured between said cathode and said reference line.

5. A circuit according to claim 1, including a transformer having a primary winding connected to the cable for carrying a signal, and secondary winding connected between said first-mentioned and second resistors.

6. A line build out circuit for equalizing signals from plural cables of different lengths, comprising:

control voltage means for generating a control voltage indicative of the length of a cable to be traveled by a signal to be equalized;

a tuning component having a variable characteristic, an anode and a cathode, said control voltage means being connected to said anode for applying the controlled voltage thereto for varying the variable characteristic;

a capacitor connected to said anode;

a resistor connected to said cathode;

the signal to be equalized being applied over said resistor to said cathode and being measured at said cathode, the signal having a frequency roll-off representing a degree of attenuation which depends upon the frequency of the signal and upon the length of the cable over which the signal was supplied; and an equalizing amplifier connected to said cathode of said tuning component for amplifying the signal, said equalizing amplifier having an output, a peak detector connected to the output of said equalizing amplifier for measuring a voltage peak of the signal amplified by said equalizing amplifier, and an integrating amplifier connected between said peak detector and said tuning component anode for generating said control voltage, said peak detector and integrating amplifier forming said control voltage means.

7. A circuit according to claim, 6, including a first comparator and second comparator, each having positive and negative inputs, said equalizing amplifier output being connected to said negative input of said first comparator and said positive input of said second comparator, a reference voltage connected to said negative input of said second comparator and said positive input of said first comparator, said first and second comparators each having an output at which square waves are formed, corresponding to the signal processed through said equalizing amplifier.

8. A circuit according to claim 6, wherein said tuning component comprises a tuning diode, said variable characteristic comprising capacitance of said tuning diode.

9. A circuit according to claim 6, wherein said tuning component comprises a tuning varactor, said variable characteristic comprising capacitance of said tuning varactor.

10. A circuit according to claim 6, including a reference line connected to said capacitor on an opposite side thereof from said tuning component anode, the signal being measured between said cathode and said reference line.

* * * * *